(12) United States Patent
Atherton

(10) Patent No.: US 9,867,042 B2
(45) Date of Patent: Jan. 9, 2018

(54) RADIO FREQUENCY IDENTIFICATION TECHNOLOGY INCORPORATING CRYPTOGRAPHICS

(75) Inventor: Peter Samuel Atherton, Leesburg, VA (US)

(73) Assignee: MIKOH CORPORATION, McLean, VA (US)

( * ) Notice: Subject to any disclaimer, the term of this patent is extended or adjusted under 35 U.S.C. 154(b) by 492 days.

(21) Appl. No.: 14/237,478

(22) PCT Filed: Aug. 8, 2012

(86) PCT No.: PCT/AU2012/000933
§ 371 (c)(1),
(2), (4) Date: Mar. 25, 2014

(87) PCT Pub. No.: WO2013/020172
PCT Pub. Date: Feb. 14, 2013

(65) Prior Publication Data
US 2014/0286491 A1    Sep. 25, 2014

Related U.S. Application Data

(60) Provisional application No. 61/521,094, filed on Aug. 8, 2011, provisional application No. 61/554,220, filed on Nov. 1, 2011.

(51) Int. Cl.
*H04W 12/04* (2009.01)
*G06K 7/10* (2006.01)
*H04L 9/08* (2006.01)
*H04L 9/14* (2006.01)
*H04L 9/32* (2006.01)
*H04W 12/06* (2009.01)
*H04L 29/06* (2006.01)

(52) U.S. Cl.
CPC ........ *H04W 12/04* (2013.01); *G06K 7/10267* (2013.01); *H04L 9/0825* (2013.01);
(Continued)

(58) Field of Classification Search
CPC ............................. H04W 12/04; H04L 9/0825
(Continued)

(56) References Cited

U.S. PATENT DOCUMENTS 6,240,188 B1    5/2001    Dondeti et al.
6,490,680 B1 *  12/2002   Scheidt ............... H04L 63/0442
                                                           380/286

(Continued)

FOREIGN PATENT DOCUMENTS

EP         2 285 040 A1       2/2011
WO     WO 2013020172 A1 *     2/2013   ......... G06K 7/10267

OTHER PUBLICATIONS

Rivest et al., "A Method for Obtaining Digital Signatures and Public-Key Cryptosystems", 1978.*
(Continued)

*Primary Examiner* — O. C. Vostal
(74) *Attorney, Agent, or Firm* — Buchanan Ingersoll & Rooney PC

(57) ABSTRACT

Disclosed is a radio frequency identification (RFID) tag comprising: an RFID functional portion configured to enable wireless communication between the RFID tag and an RFID reader; a data processing functional portion with asymmetric cryptographic capability; and a power source configured to power the data processing functional portion.

19 Claims, 9 Drawing Sheets

(52) U.S. Cl.
CPC .......... *H04L 9/0866* (2013.01); *H04L 9/0891* (2013.01); *H04L 9/14* (2013.01); *H04L 9/321* (2013.01); *H04L 9/3231* (2013.01); *H04L 9/3247* (2013.01); *H04W 12/06* (2013.01); *H04L 63/045* (2013.01); *H04L 63/0442* (2013.01); *H04L 63/0861* (2013.01); *H04L 2209/80* (2013.01); *H04L 2209/805* (2013.01)

(58) Field of Classification Search
USPC ........................................................ 380/270
See application file for complete search history.

(56) References Cited

U.S. PATENT DOCUMENTS

| | | | | |
|---|---|---|---|---|
| 8,392,699 | B2* | 3/2013 | Jones | H04L 65/1053 380/270 |
| 8,717,165 | B2* | 5/2014 | Gernandt | G06K 19/0705 340/539.13 |
| 8,811,620 | B2* | 8/2014 | Chaves | G06F 21/6218 380/277 |
| 8,941,469 | B1* | 1/2015 | Diorio | H04L 9/3247 340/10.1 |
| 2005/0193103 | A1* | 9/2005 | Drabik | H04L 63/0272 709/221 |
| 2006/0064384 | A1* | 3/2006 | Mehrotra | G01S 3/7864 705/57 |
| 2006/0087407 | A1* | 4/2006 | Stewart | G06K 17/00 340/10.52 |
| 2006/0136717 | A1* | 6/2006 | Buer | H04L 9/3234 713/155 |
| 2006/0143452 | A1* | 6/2006 | Numao | H04L 9/3236 713/168 |
| 2006/0161878 | A1* | 7/2006 | Koh | G06F 8/10 717/100 |
| 2006/0219776 | A1* | 10/2006 | Finn | B60R 25/25 235/380 |
| 2007/0052523 | A1* | 3/2007 | Jin | H04L 9/0891 340/10.2 |
| 2007/0060394 | A1* | 3/2007 | Gowin | G06F 8/61 463/47 |
| 2007/0067634 | A1* | 3/2007 | Siegler | G06F 21/31 713/171 |
| 2007/0081667 | A1* | 4/2007 | Hwang | H04L 9/3271 380/30 |
| 2007/0106892 | A1* | 5/2007 | Engberg | G06Q 20/02 713/168 |
| 2008/0001752 | A1* | 1/2008 | Bruns | G06Q 10/08 340/572.1 |
| 2008/0063210 | A1* | 3/2008 | Goodman | H04L 9/0822 380/286 |
| 2008/0065892 | A1* | 3/2008 | Bailey | H04L 63/0492 713/171 |
| 2008/0094217 | A1* | 4/2008 | Okamasu | G06Q 10/08 340/572.1 |
| 2008/0164984 | A1* | 7/2008 | Sheffer | B60R 25/1004 340/426.13 |
| 2008/0170695 | A1* | 7/2008 | Adler | H04L 9/0841 380/277 |
| 2008/0191882 | A1* | 8/2008 | Zhou | G06F 21/79 340/572.4 |
| 2008/0238676 | A1* | 10/2008 | Dhillon | G08B 13/2482 340/572.1 |
| 2009/0085717 | A1* | 4/2009 | Kirkjan | G07C 9/00309 340/5.2 |
| 2009/0160646 | A1* | 6/2009 | Mackenzie | G06Q 10/08 340/572.1 |
| 2009/0214038 | A1* | 8/2009 | Wong | G06K 7/0008 380/270 |
| 2009/0224884 | A1* | 9/2009 | Tuttle | G06K 7/0008 340/10.1 |
| 2009/0231138 | A1* | 9/2009 | Lai | G06K 19/0707 340/572.4 |
| 2009/0243837 | A1* | 10/2009 | Chul Lee | G08B 25/10 340/531 |
| 2009/0315673 | A1* | 12/2009 | Huang | G06K 7/0008 340/5.61 |
| 2010/0007496 | A1* | 1/2010 | Orlassino | H04W 4/02 340/572.1 |
| 2010/0088527 | A1* | 4/2010 | Johnson | A63F 13/02 713/193 |
| 2010/0127835 | A1* | 5/2010 | Pomerantz | G06K 19/07327 340/10.3 |
| 2010/0153731 | A1* | 6/2010 | Duc | H04L 9/3271 713/175 |
| 2010/0289627 | A1* | 11/2010 | McAllister | G06Q 10/087 340/10.42 |
| 2010/0308978 | A1* | 12/2010 | Brown | H04L 9/3252 340/10.42 |
| 2011/0041046 | A1* | 2/2011 | Kang | G06K 7/0008 714/807 |
| 2011/0084799 | A1* | 4/2011 | Ficko | G07C 9/00904 340/5.65 |
| 2011/0109434 | A1* | 5/2011 | Hadsall, Sr. | G08B 21/22 340/8.1 |
| 2011/0167010 | A1* | 7/2011 | Soppera | G06Q 30/0185 705/318 |
| 2011/0173684 | A1* | 7/2011 | Hurry | G06F 21/33 726/6 |
| 2011/0213972 | A1* | 9/2011 | Chabanne | H04L 9/0836 713/168 |
| 2011/0266345 | A1* | 11/2011 | Fowler | H05B 37/0272 235/439 |
| 2011/0291803 | A1* | 12/2011 | Bajic | G08B 13/2462 340/10.1 |
| 2011/0309931 | A1* | 12/2011 | Rose | E21F 17/18 340/539.13 |
| 2011/0320805 | A1* | 12/2011 | Chaves | G06Q 10/087 713/150 |
| 2012/0011360 | A1* | 1/2012 | Engels | H04L 9/006 713/166 |
| 2012/0019363 | A1* | 1/2012 | Fein | G06K 19/072 340/10.1 |
| 2012/0027212 | A1* | 2/2012 | Ruland | H04L 9/12 380/278 |
| 2012/0066499 | A1* | 3/2012 | Ali | G06F 21/305 713/170 |
| 2012/0188074 | A1* | 7/2012 | Williams | G06Q 50/26 340/539.13 |
| 2012/0210118 | A1* | 8/2012 | Chaves | G06F 21/6218 713/150 |
| 2012/0314865 | A1* | 12/2012 | Kitchen | H04L 9/0877 380/270 |
| 2012/0331307 | A1* | 12/2012 | Fernandez Gutierrez | G06F 21/72 713/190 |
| 2013/0013922 | A1* | 1/2013 | Kerschbaum | H04L 63/062 713/168 |
| 2013/0285795 | A1* | 10/2013 | Virtanen | G01K 1/024 340/10.1 |
| 2013/0320079 | A1* | 12/2013 | Nordin | G06K 5/00 235/375 |
| 2014/0136840 | A1* | 5/2014 | Spalka | G06F 21/6218 713/165 |
| 2014/0286491 | A1* | 9/2014 | Atherton | G06K 7/10267 380/270 |
| 2015/0271159 | A1* | 9/2015 | Springer | G06F 7/588 713/171 |

OTHER PUBLICATIONS

Kaliski, "IEEE P1363: Standard Specifications for Public-Key Cryptography", 1999.*
Wang et al., "Active RFID System with Cryptography and Authentication Mechanisms", 2010.*
Dong et al., "Security Enhancement of Biometrics, Cryptography and Data Hiding by Their Combinations", 2008.*

(56) References Cited

OTHER PUBLICATIONS

Choi et al., "Anti-cloning protocol suitable to EPCglobal Class-1 Generation-2 RFID systems", 2009.*
Huang et al., "Secured RFID Mutual Authentication Scheme for Mifare Systems", 2012.*
Lee et al., "EC-RAC (ECDLP Based Randomized Access Control): Provably Source RFID authentication protocol", 2008.*
Ahamed et al., "ERAP: ECC based RFID Authentication Protocol", 2008.*
Balachandran et al., "A 440-nA True Random Number Generator for Passive RFID Tags", 2008.*
Batina et al., "Public-Key Cryptography for RFID Tags and Applications", 2008.*
Dominikus et al., "mCoupons: An Application for Near Field Communications (NFC)", 2007.*
Furbass et al., "ECC Processor with Low Die Size for RFID Applications", 2007.*
Godor et al., "Elliptic Curve Cryptography Based Authentication Protocol for Low-Cost RFID Tags", 2011.*
Hutter et al., "An ECDSA Processor for RFID Authentication", 2010.*
Johnson et al., "The Elliptic Curve Digital Signature Algorithm (ECDSA)", 2001.*
Kern et al., "Low-Resource ECDSA Implementation for Passive RFID Tags", 2010.*
Kim et al., "A Lightweight ECC Algorithm for Mobile RFID Service", 2010.*
Lee et al., "Elliptic-Curve-Based Security Processor for RFID", 2008.*
Malik, "Efficient Implementation of Elliptic Curve Cryptography Using Low-power Digital Signal Processor", 2010.*
Mao et al., "A 90nm CMOS UHF/UWB Asymmetric Transceiver for RFID Readers", 2011.*
McLoone et al., "Public Key Cryptography and RFID Tags", "Topics in Cryptology—CT-RSA 2007", p. 372, 2007.*
Suh et al., "Physical Unclonable Functions for Device Authentication and Secret Key Generation", 2007.*
Tuyls et al., "RFID-Tags for Anti-counterfeiting", 2006.*
Wolkerstorfer, "Scaling ECC Hardware to a Minimum", 2005.*
Yang et al., "Implementing Minimized Multivariate PKC on Low-Resource Embedded Systems", "Security in Pervasive Computing", 2006.*
Aigner et al., "Secure Symmetric Authentication for RFID Tags", 2005.*
Braun et al., "Using Elliptic Curves on RFID Tags", 2008.*
ISO/IEC, "Information technology—Security techniques—Entity authentication—Part 2: Mechanisms using symmetric encipherment algorithms", ISO/IEC 9798-2, 1999.*
Robshaw, "An overview of RFID tags and new cryptographic developments", 2006.*
International Search Report (PCT/ISA/210) dated Oct. 10, 2012, by the Australian Patent Office as the International Searching Authority for International Application No. PCT/AU2012/000933.
Wang et al., "Active RFID System with Cryptography and Authentication Mechanisms", Journal of Information Science and Engineering, Jul. 2010, pp. 1323-1344, vol. 26, No. 4.
Pretty Good Privacy, retrieved from the Internet on Feb. 6, 2014, URL: http://web.archive.org/web/20100830154353/http://en.wikipedia.org/wiki/Pretty_Good_Privacy, published on Oct. 26, 2010 as per Wayback Engine.
Lin, Jen-Chiun et al., "Secure and efficient group key management with shared key derivation", Computer Standards and Interfaces, Jan. 1, 2009, pp. 192-208, vol. 31, No. 1.
Extended European Search Report dated Mar. 12, 2015, by the European Patent Office in corresponding European Patent Application No. 12822564.6-1806 (9 pages).

* cited by examiner

RADIO FREQUENCY IDENTIFICATION TECHNOLOGY INCORPORATING CRYPTOGRAPHICS

TECHNICAL FIELD

The present invention relates to the use of radio frequency identification (RFID) technology in a communications network.

BACKGROUND OF THE INVENTION

Passive Radio Frequency Identification (RFID) tags are increasingly being used as a low cost means to identify, monitor and track items.

A significant problem with passive RFID tags, however, is the lack of security for data stored on the tags. Many passive RFID tags offer little or no security, and even the most sophisticated passive tags are subject to attacks through methods such as "spoofing". Spoofing refers to a process in which a device is used to eavesdrop on an exchange between an RFID tag and a reader, and the device is subsequently used to replay and imitate the response of the RFID tag, thereby causing an RFID reader to interpret (falsely) that said RFID tag is present when it is not.

In most RFID applications the RFID tags are read without any human involvement or intervention. In such situations spoofing presents a real risk, since the use of a spoofing device is unlikely to be detected. Similarly, other methods of attack present real threats to the security of data in an RFID system. This security flaw renders passive RFID infeasible for many applications in which security—either security of the tag data or security of the process for which the RFID tag is being used—is important.

Data security is likely to be a critical issue as RFID becomes more widely used in internet-based networks, where the data and network devices are exposed to attack.

OBJECT OF THE INVENTION

It is the object of the present invention to overcome or substantially ameliorate at least one of the above disadvantages.

Preferred forms of the present invention have the object of overcoming or at least substantially ameliorating at least some of the above disadvantages by using RFID tags that combine a passive or semi-passive RFID air-interface protocol with on-board asymmetric (public/private key) cryptographic technology and optionally also on-board symmetric cryptographic technology. Said RFID tags are used in a network in such a manner that the on-board cryptographic technology ensures the security and authenticity of data sent from an RFID tag into the network or from the network to an RFID tag, thereby preventing spoofing, the use of cloned RFID tags, and interference with data sent to or from said RFID tags.

SUMMARY OF THE INVENTION

In accordance with a first aspect, there is disclosed herein a radio frequency identification (RFID) tag comprising:
    an RFID functional portion configured to enable wireless communication between the RFID tag and an RFID reader;
    a data processing functional portion with asymmetric cryptographic capability; and
    a power source configured to power the data processing functional portion.

Preferably, the data processing functional portion comprises:
    means to generate public-private cryptographic key pairs, each public-private cryptographic key pair comprising a public key and a private key for use in asymmetric cryptographic operations;
    means to securely and secretly retain said private keys; and
    means to release said public keys for use by other devices.

Preferably, said power source is configured to power the RFID functional portion.

Preferably, said power source is not configured to generate or boost radio frequency transmission from the RFID functional portion.

Preferably, the data processing functional portion further comprises symmetric cryptographic capability.

Preferably, the data processing functional portion is further configured to store a unique unalterable identification code.

Preferably, the data processing functional portion and the RFID functional portion are combined into a single integrated circuit.

Preferably, the communication is two-way.

Preferably, the RFID functional portion comprises an integrated circuit.

Preferably, the data processing functional portion comprises a microprocessor.

Preferably, the wireless communication between the RFID functional portion and an RFID is at UHF frequencies.

In accordance with a second aspect, there is disclosed herein a network comprising:
    a server with asymmetric cryptographic capability;
    a plurality of radio frequency identification (RFID) tags in accordance with the first aspect; and
    one or more RFID readers, each RFID reader being configured to relay data between the server and one or more RFID tags, thereby enabling secure and authenticable communication between the one or more RFID tags and the server.

Preferably, the server comprises:
    means to generate public-private cryptographic key pairs, each public-private cryptographic key pair comprising a public key and a private key for use in asymmetric cryptographic operations;
    means to securely and secretly retain said private keys; and
    means to release said public keys for use by other devices.

Preferably, each RFID functional portion is configured to enable wireless communication between the corresponding RFID tag and any of the RFID readers.

Preferably, the network further comprises a public key server configured to securely store public keys from public-private cryptographic key pairs for retrieval by any of the server, the RFID readers, and the RFID tags.

Preferably, each of the server and the RFID tags is configured to upload its internally-generated public keys to the public key server.

Preferably, the server and each RFID tag are further configured with symmetric cryptographic capability.

Preferably, the secure and authenticable communication between the one or more RFID tags and the server uses the symmetric cryptographic capabilities thereof.

Preferably, at least one RFID reader is further configured to add supplemental information to the data being relayed between the server and the one or more RFID tags.

Preferably, the at least one RFID reader has asymmetric cryptographic capability such that said supplemental information is added securely and authenticably to the data being relayed between the server and the one or more RFID tags.

Preferably, the at least one RFID reader has symmetric cryptographic capability such that said supplemental information is added securely to the data being relayed between the server and the one or more RFID tags.

Preferably, at least one RFID tag is configured to interface to an apparatus or process in order to:

receive data from said apparatus or process, or transfer information to said apparatus or process to influence or control said apparatus or process.

Preferably, the network further comprises a device connected to the server, the device being configured to perform one or more of:

obtain information from the server, the information relating to one or more of the RFID tags; and send data to the server, the server being configured to transfer the data to one or more of the RFID tags via the RFID readers.

Preferably, at least one RFID reader is configured to relay data between the server and the one or more RFID tags in a manner dependent on the type of the one or more RFID tags.

Preferably, the network further comprises one or more passive RFID tags, wherein each passive RFID tag comprises an RFID functional portion configured to enable wireless communication between the passive RFID tag and an RFID reader. Preferably, at least one RFID reader is configured to relay data between the server and the one or more RFID tags in a manner dependent on whether the one or more RFID tags are passive RFID tags.

In accordance with a third aspect, there is disclosed herein a method of securely communicating data between a radio frequency identification (RFID tag and a server, the method comprising:

generating, by the RFID tag and the server, a symmetric encryption/decryption key;

encrypting, by one of the RFID tag and the server, the data using the symmetric encryption/decryption key;

generating, by the one of the RFID tag and the server, a digital signature for the data using a private cryptographic encryption key;

wirelessly transmitting, by the one of the RFID tag and the server, the encrypted data and the digital signature to the other of the RFID tag and the server;

validating, by the other of the RFID tag and the server, the digital signature using the public decryption key corresponding to the private cryptographic encryption key, said public decryption key being authenticated by reference to a public key server;

decrypting, by the other of the RFID tag and the server, the encrypted data using the symmetric encryption/decryption key.

Preferably, the generating of the symmetric encryption/decryption key comprises:

generating, by one of the RFID tag and the server, a random number;

encrypting, by the one of the RFID tag and the server, the random number using a public cryptographic encryption key of the other of the RFID tag and the server;

transmitting, by the one of the RFID tag and the server, the encrypted number to the other of the RFID tag and the server;

decrypting, by the other of the RFID tag and the server, the encrypted random number using a private decryption key of the other of the RFID tag and the server corresponding to the public cryptographic encryption key; and generating, by the RFID tag and the server, the symmetric encryption/decryption key using the random number.

Preferably, the digital signature is generated for the encrypted data.

Preferably, the digital signature is generated prior to the encrypting step, so that encrypting encrypts both the random number and the digital signature.

Preferably, the wireless transmitting comprises:

transmitting, by the one of the RFID tag and the server, the encrypted data and the digital signature to an RFID reader;

encrypting, by the RFID reader, supplemental information using a public cryptographic encryption key of the other of the RFID tag and the server;

generating, by the RFID reader, a second digital signature for the encrypted supplemental information and the encrypted data and the digital signature using a private cryptographic encryption key associated with the RFID reader;

transmitting, by the RFID reader, the encrypted supplemental information, the encrypted data and the digital signature, and the second digital signature to the other of the RFID tag and the server;

validating, by the other of the RFID tag and the server, the second digital signature using a second public decryption key corresponding to the private cryptographic encryption key associated with the RFID reader, said second public decryption key being authenticated by reference to a public key server; and decrypting, by the other of the RFID tag and the server, the encrypted supplemental information using a private decryption key of the other of the RFID tag and the server corresponding to the public cryptographic encryption key.

In accordance with a fourth aspect, there is disclosed herein a method of updating a public cryptographic decryption key stored at one of an RFID tag and a server, said public cryptographic decryption key originating from the other of the RFID tag and the server, the method comprising:

combining, by the other of the RFID tag and the server, a new public cryptographic decryption key with a current public cryptographic decryption key corresponding to the public cryptographic decryption key stored at the one of the RFID tag and the server;

generating, by the other of the RFID tag and the server, a digital signature for the combined new public cryptographic decryption key and current public cryptographic decryption key using a private cryptographic encryption key corresponding to the current public cryptographic decryption key;

transmitting, by the other of the RFID tag and the server, the combined new public cryptographic decryption key and current public cryptographic decryption key and the digital signature to the one of the RFID tag and the server, validating, by the one of the RFID tag and the server, the digital signature using the public cryptographic decryption key stored at the one of the RFID tag and the server, where the public cryptographic decryption key has previously been securely transferred to the one of the RFID tag and the server; and replacing the public cryptographic decryption key stored at the one of the RFID tag and the server with the new public cryptographic decryption key.

Preferably, before the combining, the other of the RFID tag and the server determines whether the public cryptographic decryption key stored at the one of the RFID tag and the server is the same as the new public cryptographic decryption key, and proceeding with the combining based on the determination.

Preferably, before the combining, the other of the RFID tag and the server transfers, via an authenticated communications link, the current public cryptographic decryption key for storage at the one of the RFID tag and the server.

Preferably, the data processing functional portion of the tag according to the first aspect further comprises:

means to associate one or more private cryptographic keys with an authorized user of the RFID tag;

means to store said associated private keys in a default disabled state such that in the disabled state said private keys cannot be used;

means to securely store template biometric data for said authorized user in association with said private keys;

means to accept live biometric data from a user of the RFID tag;

means to compare said live biometric data with said template biometric data and thereby determine whether said live biometric data corresponds to said authorized user of the RFID tag;

means to select and enable for a specified cryptographic operation a biometrically associated private cryptographic key depending on the result of said comparison of live and template biometric data, said biometrically associated private cryptographic key otherwise remaining disabled.

Preferably, the live biometric data comprises one or more of the group consisting of fingerprint data, voice data, facial image data, and retinal scan data.

BRIEF DESCRIPTION OF THE DRAWINGS

Preferred embodiments of the present invention will now be described by way of non-limiting example with reference to the schematic illustrations of FIGS. 1 to 9, wherein.

With regard to the figures, it should be noted that numeric identifiers that appear in multiple figures have the same meaning throughout. For example, the numeric identifier 100 has the same meaning throughout FIGS. 1 to 9.

DETAILED DESCRIPTION OF THE PREFERRED EMBODIMENTS

Preferred embodiments of the present invention are now described by way of non-limiting example. It should be appreciated that other embodiments are possible, based on the general principles described herein.

For clarity, the terms "asymmetric" and "symmetric" where used herein have their usual meanings in relation to cryptographic processes. Asymmetric cryptography refers to public/private key cryptography in which different keys are used for encryption and decryption, whereas symmetric cryptography refers to cryptography in which the same key is used for both encryption and decryption.

The present invention relates to the use of radio frequency identification (RFID) tags in a network such as the internet. Each RFID tag communicates with the network by means of an RFID read-write device—hereinafter simply called an RFID reader, or reader.

Figure 1:
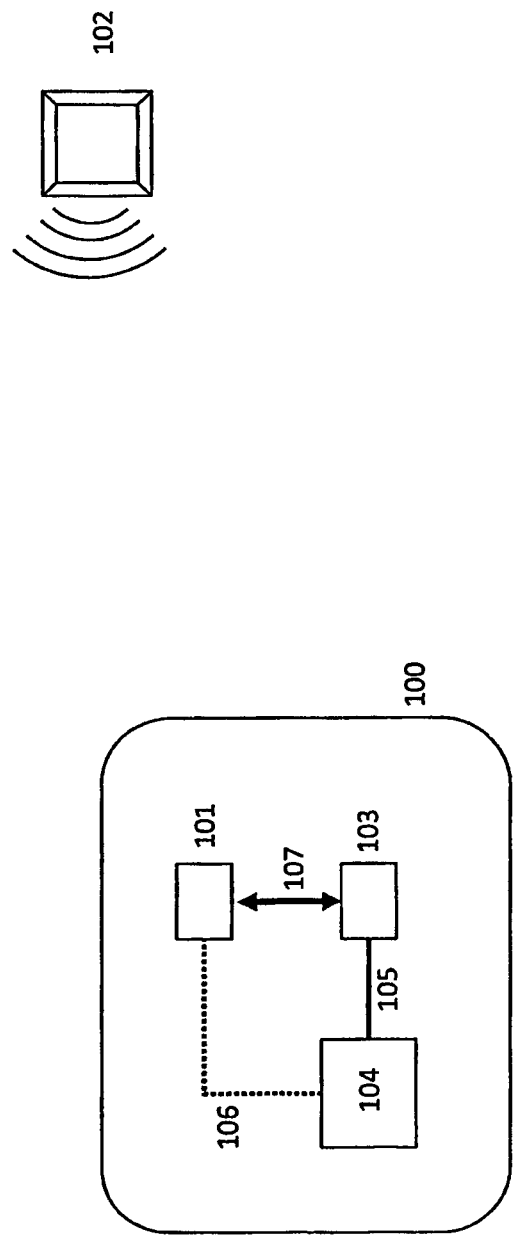
FIG. 1 is a schematic illustration of the functional components of an RFID tag.

FIG. 1 is a schematic illustration of the functional components of an RFID tag 100.

From a functional point of view the RFID tag 100 can be regarded as being divided into two functional portions that may or may not be physically separate in the tag 100:

an RFID functional portion 101, which enables communication between the RFID tag 100 and an RFID reader 102 (not shown to scale in FIG. 1); and a data processing functional portion 103, which includes the tag's cryptographic capabilities.

The RFID tag 100 includes a power source 104, such as a battery, to power the data processing functional portion 103, as indicated by the line 105 in FIG. 1. In some embodiments the power source 104 may also be used to power the RFID functional portion 101, as indicated by the dashed line 106 in FIG. 1. Other electronic components—not shown in FIG. 1—may be included in the RFID tag 100 to perform ancillary functions, such as for example to regulate power supplied by the power source 104.

Data can pass in either direction between the RFID functional portion 101 and data processing functional portion 103, as indicated by the arrow 107. Data transferred from the data processing functional portion 103 to the RFID functional portion 101 is made available to an RFID reader 102 by means of RFID communications, when the RFID tag 100 is in communication with said RFID reader 102. Similarly, data received from an RFID reader 102 by the RFID functional portion 101 is passed to the data processing functional portion 103. Expressed another way, the RFID functional portion 101 acts as a data pass-through between the data processing functional portion 103 and an RFID reader 102. The data pass-through may be continuous or on a data-packet by data-packet basis, or by means of some other data protocol. In one implementation, the RFID communication between the RFID functional portion 101 and the RFID reader 102 is at UHF (Ultra-High Frequency) frequencies—typically around 900 MHz for passive RFID systems.

Preferably, but not necessarily, the RFID functional portion 101 will be passive or semi-passive, and will communicate with an RFID reader 102 by means of an air-interface of a type used by conventional passive RFID tags. In the current context the term "passive" means that the RFID functional portion 101 is powered only by radio frequency energy from an RFID reader such as the RFID reader 102, while the term "semi-passive" means that the RFID functional portion 101 may also receive power from the power source 104 on-board the RFID tag 100 but the power source 104 is not used to generate or boost radio frequency transmission from the RFID functional portion 101—instead the power source 104 may be used, for example, to power any data storage in the RFID functional portion 101 or, in another example, to improve the response time of the RFID functional portion 101 by keeping some electronic circuits powered up. In one preferred embodiment the air interface between the RFID functional portion 101 and an RFID reader 102 may be compliant with the ISO 18000-6C standard for ultra-high frequency RFID tags.

Preferably the data processing functional portion 103 incorporates functions that include, but are not limited to, some or all of the following:

capabilities to enable public/private key cryptographic operation, including:
    a means to generate public-private cryptographic key pairs for use in asymmetric cryptographic operations;
    a means to securely and secretly retain said private keys;
    a means to release said public keys for use by other devices;
    a means to carry out cryptographic operations, including but not limited to:
        a means to generate digital signatures using a private encryption key of the data processing functional portion 103;
        a means to encrypt information using a public encryption key obtained externally;
        a means to decrypt information using a private decryption key of the data processing functional portion 103;
other data processing means, as required;
a clock;
a data storage means that is preferably a read-write data storage means;
(optionally) a means to accept and process data from external devices (such as sensors);
(optionally) a means to transfer data to external devices.

Preferably, but not necessarily, the data processing functional portion 103 will also include a means to encrypt and decrypt data via a symmetric cryptographic protocol—i.e. a cryptographic protocol in which the same key is used for both encryption and decryption. An advantage of symmetric cryptography over asymmetric (i.e. public/private key) cryptography is that symmetric cryptographic processes usually require fewer computational steps and are therefore faster. Preferably, but not necessarily, the data processing functional portion 103 will include a means to generate symmetric keys and perform symmetric encryption and decryption processes.

Preferably, but not necessarily, each said RFID tag 100 will store a unique identification code that cannot be altered.

It should be appreciated that the RFID functional portion 101 and the data processing functional portion 103 may be physically separate or may be integrated.

Figure 2:
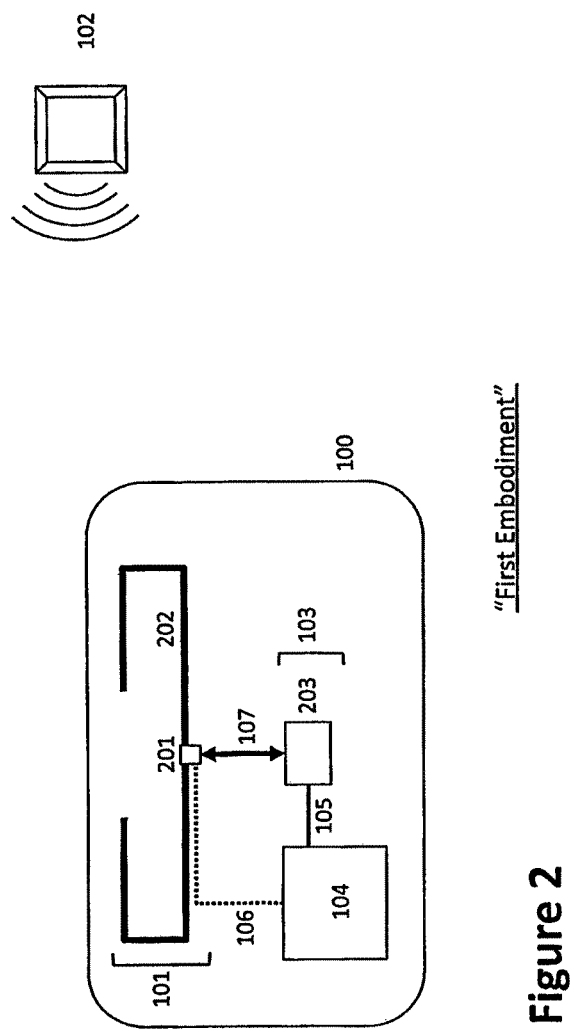
FIG. 2 is a schematic illustration of the physical configuration of a first preferred embodiment of the RFID tag of FIG. 1.

FIG. 2 is a schematic illustration of a preferred embodiment of the RFID tag 100 in which the RFID functional portion 101 and data processing functional portion 103 of the tag 100 are physically separate, with the RFID portion 101 preferably comprising an RFID integrated circuit 201 and an RFID antenna 202, and the data processing functional portion 103 preferably comprising a separate data processing integrated circuit (such as a microcontroller or microprocessor) 203. An advantage of this configuration is that it can use existing microprocessors and some existing RFID integrated circuits (chips).

Figure 3:
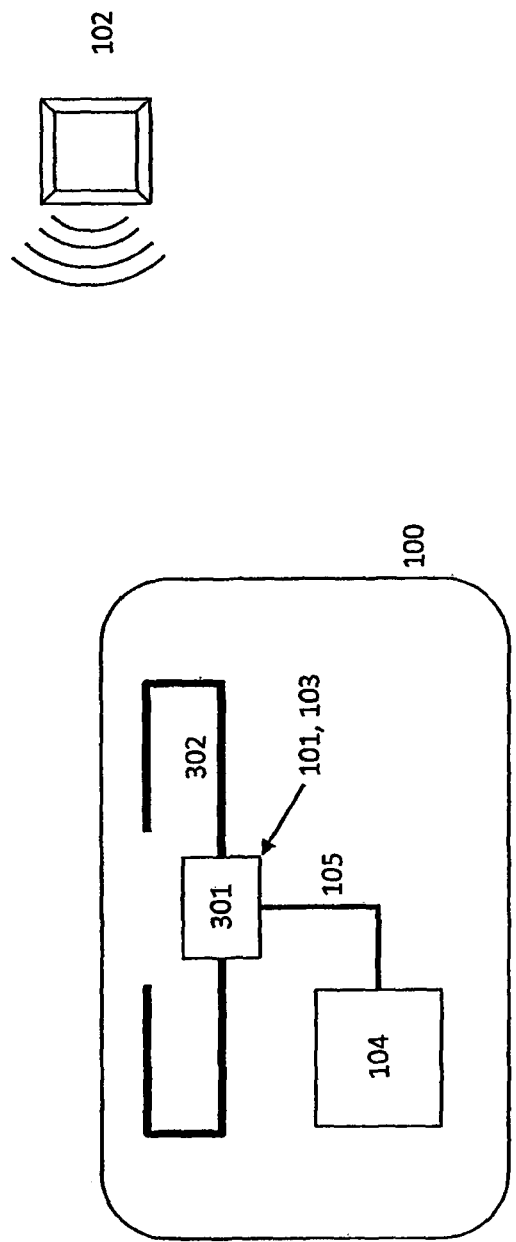
FIG. 3 is a schematic illustration of the physical configuration of a second preferred embodiment of the RFID tag of FIG. 1.

FIG. 3 is a schematic illustration of another preferred embodiment of the RFID tag 100 in which the RFID integrated circuit 201 and data processing integrated circuit 203 are combined into a single integrated circuit 301, to which is connected an RFID antenna 302.

As described above, the RFID functional portion 101 is preferably configured to act as a two-way data pass-through, providing the capability to both (i) accept data from the data processing functional portion 103 and transfer said data to an RFID reader 102 and (ii) accept data from an RFID reader 102 and transfer said data to the data processing functional portion 103. In the case of the embodiment of FIG. 2 this means that the RFID integrated circuit 201 must be configured to provide such a two-way data pass-through function, while in the case of the embodiment of FIG. 3 this means that the RFID functional portion of the combined integrated circuit 301 must be configured to provide such a two-way data pass-through function. An example of a suitable RFID integrated circuit 201 is the so-called "I2C" ultra high frequency RFID chip produced by NXP.

Each RFID tag 100 is able to communicate with an RFID reader 102 when it is in range of said reader. In some embodiments each RFID tag 100 may be configured to communicate only with certain specified RFID readers 102, and vice versa—i.e. each RFID reader 102 may be configured to communicate only with certain specified RFID tags 100.

Figure 4:
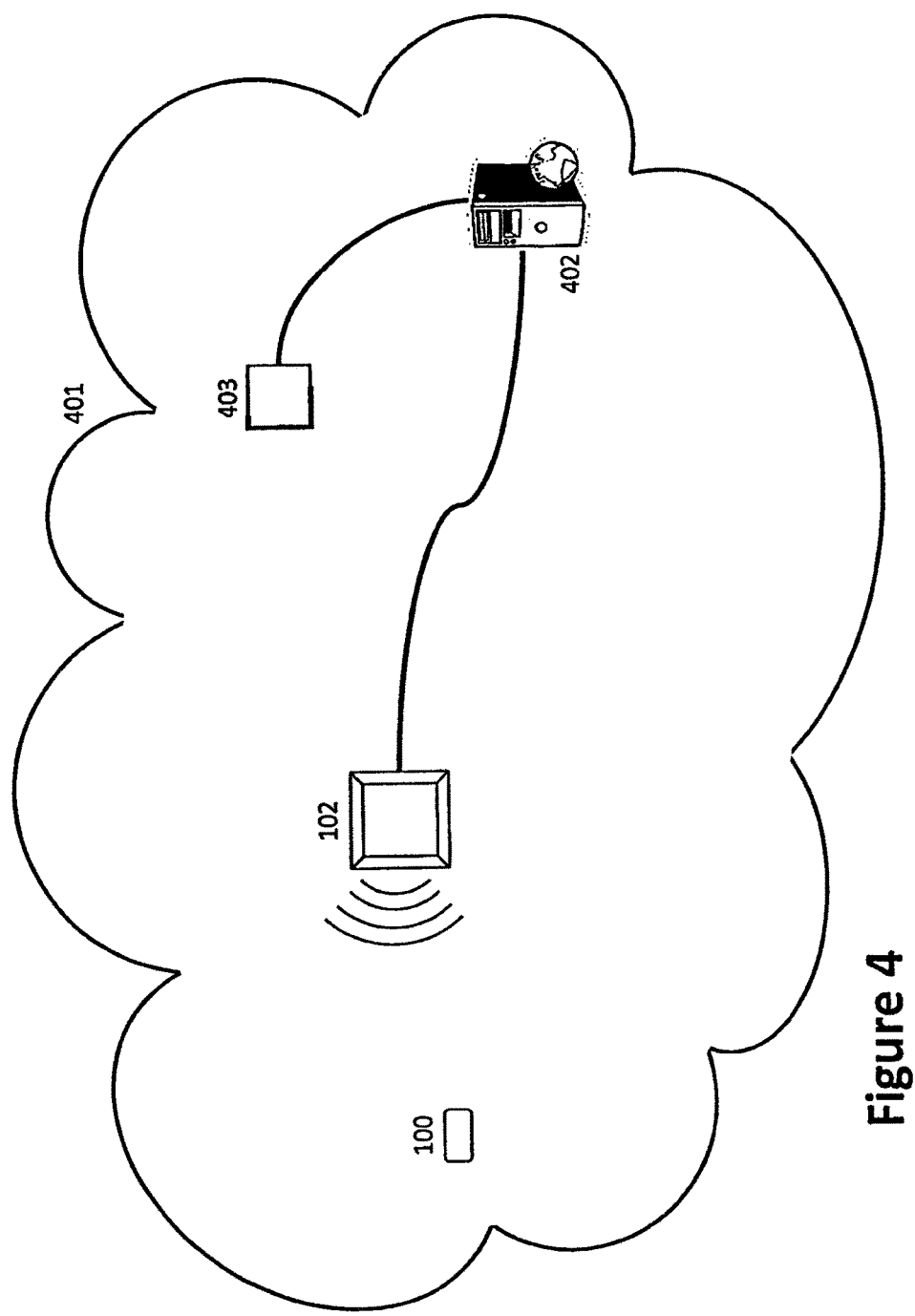
FIG. 4 is a schematic illustration of the use of the RFID tag of FIG. 1, 2 or 3 in a network.

FIG. 4 is a schematic illustration of an RFID tag 100 and an RFID reader 102 that are associated with a communications network 401. The RFID reader 102 is connected to and forms part of the communications network 401. Other similar RFID readers 102 will also typically be connected to the network 401. Connection of the RFID reader 102 to the network 401 may be either wired or wireless. In one embodiment the network 401 may be the internet, but it should be appreciated that the network 401 could be any type of network, such as a private network.

The RFID readers 102 connect to one or more servers on the network 401. For the sake of simplicity these servers will be referred to herein as a single server 402, but it should be appreciated that there may be redundant servers on the network 401 and/or the overall server capability may be distributed over a number of servers at different locations.

The RFID readers 102 in essence act as two-way data pass-throughs to connect the RFID tags 100 to the network 401, and in particular to the server 402.

Each RFID tag 100 is therefore able to connect to the server 402 via an RFID reader 102 when said RFID tag 100 is in communication with said RFID reader 102. More specifically, the data processing functional portion 103 of each RFID tag 100 is able to connect to the server 402 via an RFID reader 102 when said RFID tag 100 is in communication with said RFID reader 102, since both the RFID functional portion 101 of the RFID tag 100 and the RFID reader 102 act as data pass-throughs. When the RFID tag 100 is not in communication with an RFID reader 102, said RFID tag 100 will not at that time be able to connect to the server 402.

In one preferred embodiment any RFID tag 100 may be able to connect to the server 402 via any RFID reader 102 on the network 401. In another preferred embodiment the RFID tags 100 and RFID readers 102 on the network 401 may be segregated into subgroups, with each RFID tag 100 being able to connect to the server 402 only via a specified subgroup of RFID readers 102. This embodiment may be employed, for example, in a situation where RFID tags 100 and RFID readers 102 are segregated on an application-by-application or user-by-user basis. Other embodiments and combinations regarding the connectivity of RFID tags 100 to the server 402 via the RFID readers 102 are possible.

In one embodiment the network 401 may include one or more RFID tags 100 and one or more standard passive RFID tags (i.e. RFID tags without a data processing functional portion 103 and an on-board power source 104), with both types of RFID tag using the same air-interface technology to communicate with RFID readers 102 on the network 401. In this way the network 401 can employ RFID tags 100 where such tags are appropriate and can employ standard passive RFID tags where such simpler, lower cost tags provide adequate functionality. The RFID readers 102 will preferably be configured to differentiate between an RFID tag 100 and a standard passive RFID tag on the network 401, and thereby appropriately modify the data communications between tag and reader to suit the type of tag. Furthermore, the RFID readers 102 may in some embodiments be configured to differentiate between different types of RFID tag 100 on the network 401 and to appropriately modify data communications between tag and reader in accordance with the characteristics of the type of RFID tag 100 with which an RFID reader 102 is in communication, said characteristics including without limitation data storage capacity, cryptographic capabilities, and sensors or other devices associated with the RFID tag 100.

The server 402 provides capabilities including, but not limited to, one or more of the following:
  capabilities to enable public/private key cryptographic operation, including:
    means to securely store public keys corresponding to, and transferred from, devices on the network 401, said devices including the RFID tags 100;
    means to generate its own public/private cryptographic key pairs;
    means to securely and secretly store said server private keys;
    secure means to make said server public keys publicly available via the network 401;
    means to carry out cryptographic operations, including but not limited to:
      means to generate digital signatures using a server private key;
      means to encrypt outgoing data using an externally obtained public encryption key, such as a public encryption key of an RFID tag 100;
      means to decrypt incoming encrypted data using a server private decryption key;
  other data processing means, as required;
  data storage means that is preferably a read-write data storage means;
  a clock;
  means to receive information from RFID tags 100 (via RFID readers 102)
  means to send information to specified RFID tags 100 on the network 401;
  means to receive, and take action on, requests regarding said RFID tags 100 from users on the network 401, and means to respond to said users via the network 401.

Said requests from users on the network 401 may include, but are not limited to, requests to obtain information from specified RFID tags 100 or requests to send data or instructions to specified RFID tags 100.

Preferably, but not necessarily, the server 402 will also include a means to encrypt and decrypt data via a symmetric cryptographic protocol—i.e. a cryptographic protocol in which the same key is used for both encryption and decryption. An advantage of symmetric cryptography over asymmetric (i.e. public/private key) cryptography is that symmetric cryptographic processes usually require fewer computational steps and are therefore faster. Preferably, but not necessarily, the server 402 will include a means to generate symmetric keys.

In one embodiment the RFID tags 100 and server 402 operate a public key communications infrastructure over the network 401, with the RFID readers 102 acting as communications nodes that relay data between the server 402 and RFID tags 100. Use of public key cryptography allows information sent from an RFID tag 100 to the server 402 or from the server 402 to an RFID tag 100 to be secured and authenticated. Securing and authenticating such information transfers is especially important in applications where the RFID tags 100 carry important information or are used as a means of secure identification (such as in access control applications and product authentication applications, for example).

As described above, both the data processing functional portion 103 of each RFID tag 100 and the server 402 incorporate (i) means to generate public/private cryptographic key pairs, and (ii) means to undertake cryptographic operations. To facilitate the security and authentication functions described herein, in one embodiment the server 402 stores public key values for all RFID tags 100 on the network 401, and each RFID tag 100 on the network 401 stores the public key values for the server 402. Using known public/private key cryptographic methods, information transfers between an RFID tag 100 and the server 402 can then be secured and authenticated.

For example, in one embodiment data transferred from an RFID tag 100 to the server 402 can be secured and authenticated as follows.
  1. The data is generated within the data processing functional portion 103 of the RFID tag 100.
  2. Said data is encrypted using a public encryption key of the server 402.
  3. The encrypted data is digitally signed using a private encryption key of the data processing functional portion 103 of the RFID tag 100.
  4. The encrypted, digitally signed data is transferred to the server 402 (via an RFID reader 102).
  5. The server 402 confirms the digital signature by using the corresponding public decryption key of the data processing functional portion 103 of the RFID tag 100. This authenticates that the data was sent by the RFID tag 100 and has not been corrupted.
  6. The server decrypts the encrypted data using its own corresponding private decryption key, thereby recovering the original data generated by the data processing functional portion 103 of the RFID tag 100.

Hence in the above process the transmitted data is secure because it is encrypted; the RFID tag that originated the data transfer is authenticated; and the integrity of the data is confirmed. Other methods for securing and authenticating data transfers between the RFID tag 100 and server 402 are possible, based on public/private key cryptographic technology. Obviously the above method can be used in reverse to secure and authenticate data transfers from the server 402 to an RFID tag 100.

It should be appreciated that it is the cryptographic capabilities in both the server 402 and the data processing functional portion 103 of each tag 100 that make possible the use of public key cryptography, and thereby enable the enhanced security and authentication features described herein.

In some embodiments the data transferred between an RFID tag 100 and the server 402 may include information regarding the source, route, or destination of the data transfer. To take a specific example, data transferred over the internet from an RFID tag 100 to the server 402 may in one embodiment include one or more of the following:

- unique ID code and/or public key value(s) for the RFID tag 100, to identify the source;
- unique ID code and/or internet address (URL) for the reader, to identify the routing device;
- internet address (URL) and/or unique ID and/or public key value(s) for the server 402, to identify the destination.

An advantage of the above described public key methodology over methods currently used to secure data transfers to and from passive RFID tags is that the public key methodology, when properly configured, can prevent spoofing. Spoofing refers to a process in which a device is used to eavesdrop on an exchange between an RFID tag and a reader, and said device is subsequently used to replay and imitate the response of said RFID tag, thereby causing an RFID reader to interpret (falsely) that said RFID tag is present when it is not. Current passive RFID tags are subject to spoofing attacks.

Data generated by the data processing functional portion 103 of an RFID tag 100 to be transferred to the server 402 (via an RFID reader 102) may include, without limitation:

- data that pertains to the RFID tag 100 itself—for example the tag's unique identification code, memory contents of the RFID tag 100, a time/date stamp derived from an internal clock, etc;
- other data generated or recorded by the RFID tag 100 in the course of its operation;
- data derived from a sensor coupled to the RFID tag 100;
- data derived from a device or operation with which the RFID tag 100 is in communication.

Similarly, data generated (or received) by the server 402 to be transferred to the data processing functional portion 103 of an RFID tag 100 (via an RFID reader 102) may include, without limitation:

- data to be stored in the data processing functional portion 103 of the RFID tag 100, which data will be available to be read from the RFID tag 100 by an RFID reader that may or may not be an RFID reader 102 on the network 401;
- data for use by the data processing functional portion 103 of the RFID tag 100—for example, to reprogram or recalibrate or repurpose the data processing functional portion 103 in some way;
- data to be transferred to a sensor with which said RFID tag 100 is in communication—for example, in order to reprogram or recalibrate said sensor;
- data to be transferred to a device or process with which said RFID tag 100 is in communication, said data to be used by said device or process—for example, in order to reprogram, recalibrate, repurpose or otherwise modify the performance of said device or process.

Management of Public Keys

Management of public keys is an important issue in any public/private key cryptographic network.

In conventional PKI (Public Key Infrastructure) as currently used on the internet, public keys are distributed or authenticated by means of digital certificates that are signed by a trusted Certificate Authority. In the context of the present invention the server 402 could act as a Certificate Authority. Although conventional PKI could be used in the case of the present invention, it has a disadvantage in that digital certificates have a known revocation date at the time they are issued, effectively making it infeasible to update a public key (and the corresponding public/private key pair) other than at the revocation date of the corresponding digital certificate.

On the other hand, using a public key server on the network 401 as a secure repository of valid public key values allows key pairs (and hence public keys) to be updated at any time, thereby enabling increased security. Some of the considerations associated with the public key server approach are described below, although it should be appreciated that there are additional considerations that must be taken into account in any practical implementation.

In one embodiment the server 402 may be used as a public key server in addition to its other functions as described herein. In another embodiment the public key server may be a server on the network 401 that is separate from the server 402. In the following description it is assumed that the server 402 is used as a public key server.

As described herein, public/private cryptographic key pairs are generated by both the data processing functional portion 103 of each RFID tag 100 and the server 402. Public keys are released into the network 401, with the server 402 (in its role as a public key server) storing authenticated public key values for all RFID tags 100 and the data processing functional portion 103 of each RFID tag 100 storing public key values for the server 402. Private keys are retained securely and secretly within the device by which they are generated.

Updating of Public/Private Cryptographic Key Pairs

For security reasons, public/private key pairs may be updated from time to time, in which case new key pairs will replace the corresponding superseded key pairs.

Key pairs for an RFID tag 100 can be updated by the data processing functional portion 103 of the RFID tag 100 according to any of a number of protocols, including without limitation:

- according to a predetermined schedule;
- randomly and independently by each RFID tag 100;
- on command from the server 402;
- after each use (one-time keys).

Similarly, key pairs for the server 402 may be updated by the server 402 according to a number of protocols, including without limitation:

- according to a predetermined schedule;
- at random;
- after each use (one-time keys).

Figure 5:
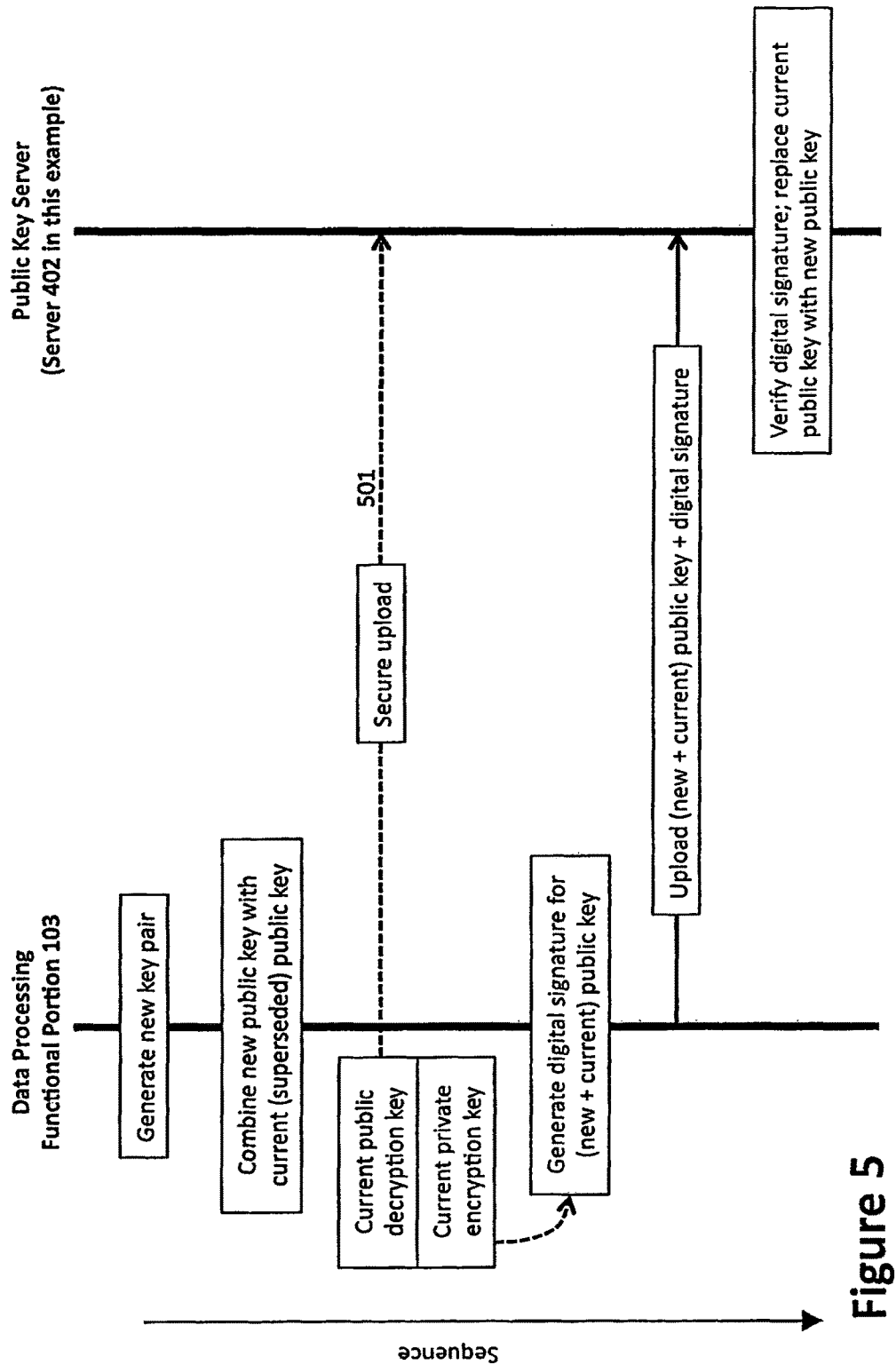
FIG. 5 is a schematic illustration of a process for updating a public key in the network of FIG. 4.
Figure 6:
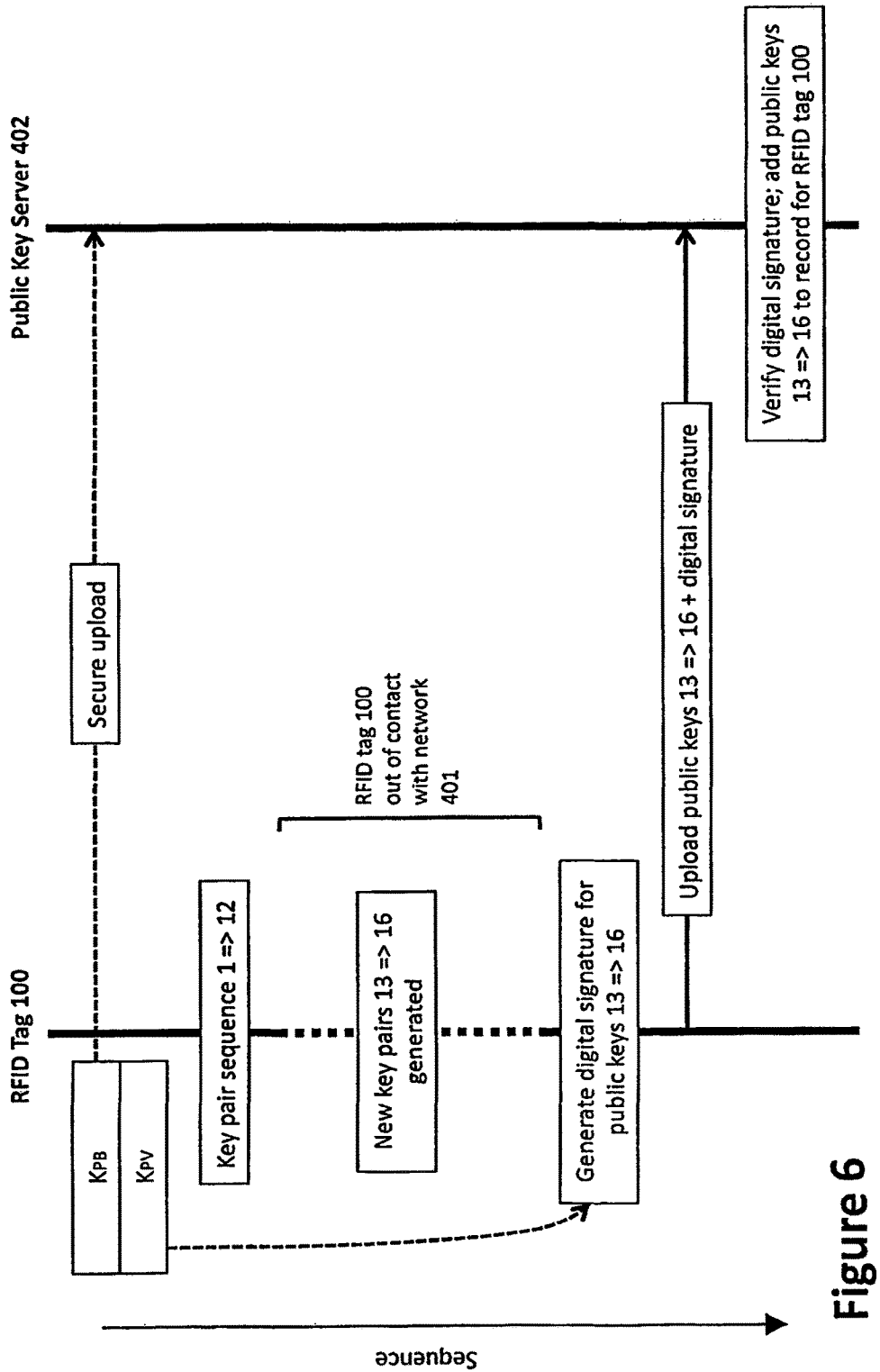
FIG. 6 is a schematic illustration of a process for synchronizing public keys in the network of FIG. 4.

Regardless of the protocol for updating of key pairs, a new key pair for either the server 402 or an RFID tag 100 requires that the new public key be made available on the network 401. Distribution of a new public key must be secure, to ensure that fake public keys are not injected into the network 401. To do this each new public key must be securely uploaded to the public key server—in this case the server 402—from which authenticated public key values can be obtained by devices on the network 401. In this context secure uploading means that the public key server 402 must be able to (i) verify the integrity of a new public key (i.e. verify that it has not been corrupted) and (ii) authenticate the source device (e.g. an RFID tag 100). These requirements can be met through the use of a digital signature. In one embodiment, illustrated in FIG. 5, a new public key is securely uploaded from the data processing functional portion 103 of an RFID tag 100 to the public key server—the server 402 in this example—as follows. The new public key is combined with the current public key that it replaces, and a digital signature for the combined (new+current) public keys is generated, said digital signature being created using a current private encryption key for the RFID tag 100 (i.e.

a private encryption key for the device issuing the new public key), where the current public decryption key corresponding to said current private encryption key has been previously securely uploaded to the public key server 402, as indicated by the dashed arrow 501 in FIG. 5. By using said current public decryption key the public key server 402 can confirm that the new public key is an authentic replacement for the superseded (i.e. current) public key. In other words, a new public key that is uploaded to the public key server—the server 402 in this example—is authenticated by use of a current private encryption key of the device that releases the new public key.

Hence for each key pair there is a sequential chain of historical superseded key pairs going back to the corresponding initial key pair. Similarly, for each authenticated public key released into the network 401 there is a sequential chain of historical superseded authenticated public keys going back to the corresponding initial public key.

This raises the question of how the initial public keys are authenticated, given that they have no antecedent public keys.

Generation and Distribution of Initial Public Key Values

At the time it is first commissioned the server 402 will generate initial key pairs.

In contrast, RFID tags 100 for use on the network 401 may not all be manufactured or deployed at once. Instead, RFID tags 100 may be manufactured or deployed into the network 401 over time, as required.

In one preferred embodiment the initial public key values for the server 402 and each RFID tag 100 may be distributed as follows.

The data processing functional portion 103 of each RFID tag 100 will generate initial public/private key pairs either at the time it is manufactured or prior to deployment into the network 401. The initial public keys will be transferred to the server 402 by means of an authenticated communications link—i.e. a communications link that is authenticated other than by using a private key of the RFID tag 100 (since the corresponding initial public key is unknown to the server 402 at that time). Similarly, the then-current public keys for the server 402 will be transferred to said RFID tag 100 by means of an authenticated communications link—i.e. a communications link that is authenticated other than by using a private key of the server 402 (since the corresponding public key is unknown to the RFID tag 100 at that time). The server 402 and RFID tag 100 will then each have authenticated initial public keys for the other. This creates a starting point from which updated public keys can be authenticated as described herein.

Synchronizing Public Keys

Another issue relating to public key management stems from the fact that cryptographically enabled devices on the network 401, and in particular the RFID tags 100, may not be in continuous contact with the public key server—in this case the server 402. During the time between one contact and the next it is possible that keys may have been updated on either a device (e.g. an RFID tag 100) or the public key server 402, in which case it is important that the device and the public key server 402 synchronize public key values when the device reconnects to the network 401. In the following description the RFID tags 100 are used as an example of a network device that may update key pairs while out of contact with the network 401, but it should be appreciated that the same considerations also apply to other network devices.

In one preferred embodiment, when an RFID tag 100 re-establishes contact with the network 401, the RFID tag 100 and public key server 402 may first confirm that each has up-to-date public key values for the other. If, for example, key updating has occurred on the RFID tag 100 and one or more updated public keys need to be securely uploaded from the RFID tag 100 to the public key server 402, the updated public key value(s) can be authenticated to the public key server 402 by means of a digital signature created by the RFID tag 100 using a private encryption key of the RFID tag 100 corresponding to the most recent authenticated public decryption key of the RFID tag 100 that is stored on the public key server 402. An example of this is shown schematically in FIG. 6, where in this example a key pair for the RFID tag 100 is updated from its $12^{th}$ generation to its $16^{th}$ generation while the RFID tag 100 is out of contact with the network 401. Hence the last authenticated public key value (for this particular key pair sequence) for the RFID tag 100 that is stored on the public key server 402 is the $12^{th}$ generation public key. When the RFID tag 100 reconnects to the network 401 it will then upload the $13^{th}$ to $16^{th}$ generation public key values to the public key server 402, with the upload being authenticated by means of a digital signature generated by the RFID tag 100 using a private encryption key $K_{PV}$ corresponding to the most recent public decryption key $K_{PB}$ for the RFID tag 100 that has been securely uploaded to the public key server 402. It should be appreciated that the key pair $K_{PV}/K_{PB}$ will not necessarily belong to the key pair genealogy that has been updated. The same consideration also applies in reverse. If key updating has occurred on the public key server 402 and updated public key values need to be securely downloaded from the public key server 402 to the RFID tag 100, the updated public key values can be authenticated to the RFID tag 100 by means of a digital signature created by the public key server 402 using a private encryption key of the public key server 402 corresponding to the most recent authenticated public decryption key of the public key server 402 that is stored on the RFID tag 100. Once the public key values on both devices (the RFID tag 100 and server 402) have been brought up to date, the RFID tag 100 can then continue with any required secure information exchanges. Because the most recent authenticated sending device (RFID tag 100 or public key server 402) public decryption key that is retained by the receiving device (public key server 402 or RFID tag 100, respectively) may in some instances be several generations old, it is preferable for the sending device to retain a history of its own key pairs in order that it can access old key values. Since the sending device may be either an RFID tag 100 or the public key server 402, it is therefore preferable for each of the RFID tags 100 and the server 402 to retain a history of its own key pairs. Similar considerations extend to other devices on the network 401.

If key updating occurs while an RFID tag 100 is in contact with the server 402, the updated public key value, authenticated by a digital signature, is preferably distributed at that time, as described herein.

Numerous other considerations are relevant to the management of public keys for the RFID tags 100 and server 402.

Supplemental Information Added by an RFID Reader

As described herein, preferably an RFID reader 102 will act as a data pass-through, transferring data from an RFID tag 100 to the server 402 or from the server 402 to an RFID tag 100. By this is meant that an RFID reader 102 preferably will not carry out any processing of data sent from an RFID tag 100 to the server 402 via said RFID reader 102 or from the server 402 to an RFID tag 100 via said RFID reader 102. In some embodiments, however, an RFID reader 102 may be configured to add supplemental information to data sent from an RFID tag 100 to the server 402 via the RFID reader 102 or from the server 402 to an RFID tag 100 via the RFID reader 102. Said supplemental information may include, without limitation, one or more of the following:

the location of the RFID reader 102;

environmental conditions in the vicinity of the RFID reader 102;

identifying information regarding the RFID reader 102 a date/time stamp for the data pass-through.

A fixed RFID reader 102 may have its permanent location stored in an on-board memory. A movable RFID reader 102 may incorporate a means, such as a GPS device, to determine its location. Environmental conditions in the vicinity of an RFID reader 102 may be determined by means of sensors coupled to the RFID reader 102. Since passive RFID read distances are short (typically 10 meters or less), environmental information pertaining to an RFID reader 102 will in most cases be approximately valid for an RFID tag 100 that is in communication with said RFID reader 102.

It may be desirable to secure and be able to authenticate said supplemental information. In some embodiments this may be done by the same public/private key cryptographic methods as are described herein for securing and authenticating data transferred between the data processing functional portion 103 of an RFID tag 100 and the server 402. To achieve this security and authentication each RFID reader 102 will preferably be equipped with capabilities to enable public/private key cryptographic operation, including, without limitation, one or more of the following:

a means to generate public-private cryptographic key pairs for use in asymmetric cryptographic operations;

a means to securely and secretly retain the private keys;

a means to release the public keys to the network 401 for use by RFID tags 100 and the server 402;

a means to generate digital signatures using a private encryption key of the RFID reader 102;

a means to encrypt information using a public key obtained externally;

a means to decrypt information using a private decryption key of the RFID reader 102.

Preferably, but not necessarily, the reader 102 may also include a means to encrypt and decrypt data via a symmetric cryptographic protocol—i.e. a cryptographic protocol in which the same key is used for both encryption and decryption. An advantage of symmetric cryptography over asymmetric (i.e. public/private key) cryptography is that symmetric cryptographic processes usually require fewer computational steps and are therefore faster. Preferably, but not necessarily, the reader 102 will include a means to generate symmetric keys.

Figure 7:
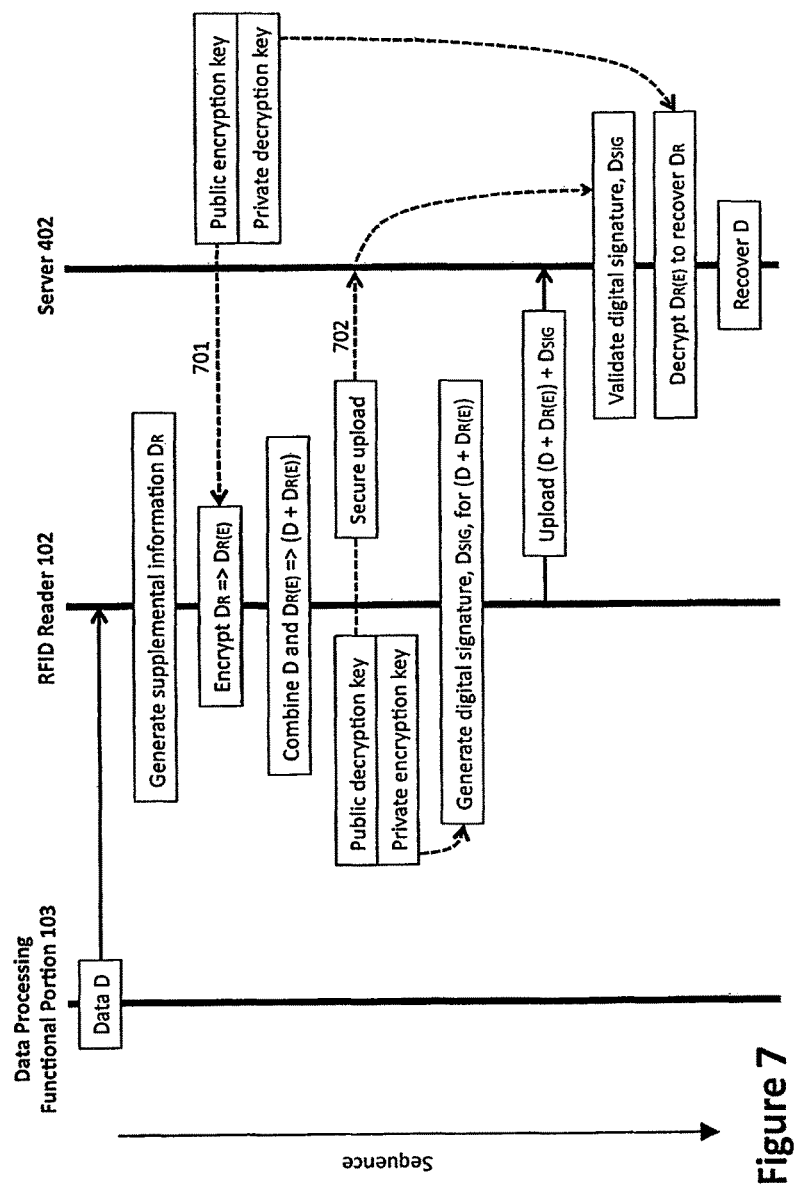
FIG. 7 is a schematic illustration of a process for securing and authenticating said supplemental information in the network of FIG. 4.
Figure 8:
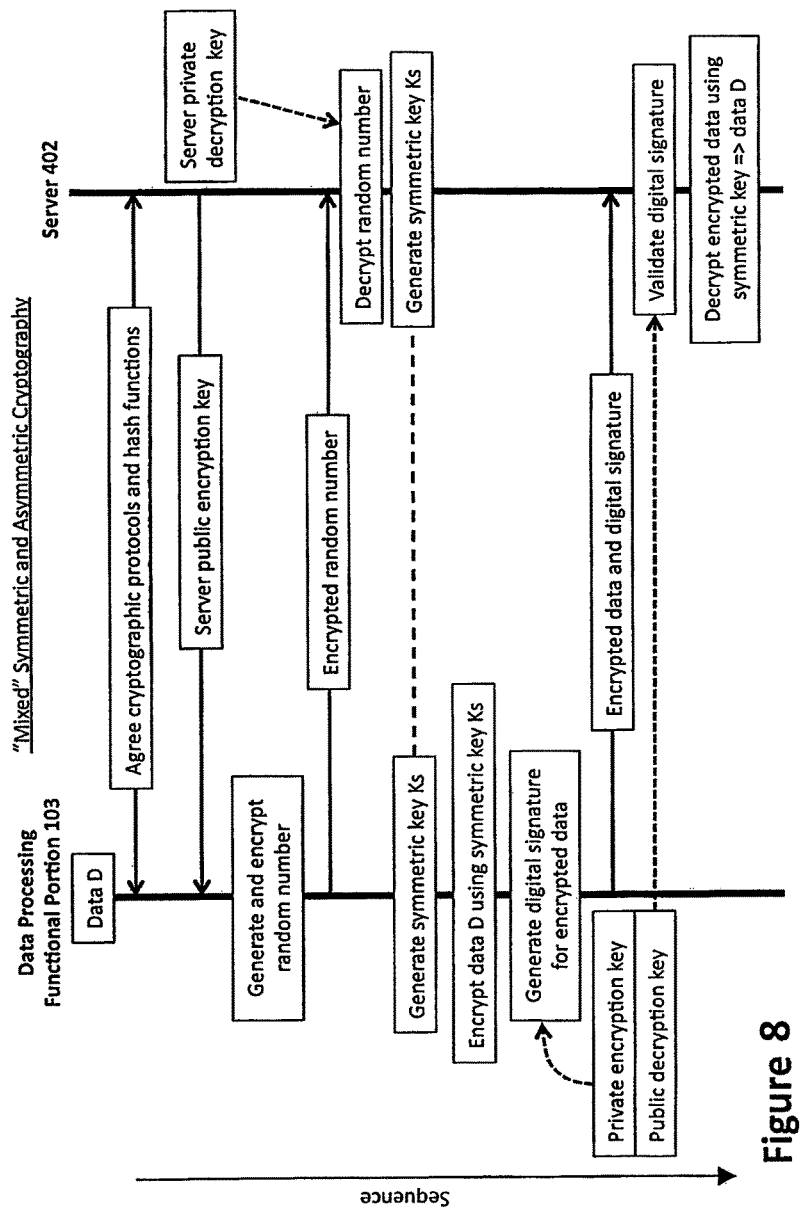
FIG. 8 is a schematic illustration of a typical process sequence for the case of an RFID tag incorporating both asymmetric and symmetric cryptographic technology in the network of FIG. 4.

To take a specific example, data D transferred from the data processing functional portion 103 of an RFID tag 100 to the server 402 via an RFID reader 102 may have supplemental information $D_R$ added by the RFID reader 102. One method for securing and authenticating said supplemental information, illustrated in FIG. 7, is as follows:

1. The supplemental information $D_R$ is generated by the RFID reader 102.
2. The supplemental information $D_R$ is encrypted using a public encryption key of the server 402, which public encryption key has previously been securely downloaded from the public key server 402, as indicated by the dashed arrow 701 in FIG. 7, generating encrypted data $D_{R(E)}$.
3. The encrypted supplemental information $D_{R(E)}$ is combined with said data D and a digital signature $D_{SIG}$ for the combined data $(D+D_{R(E)})$ is generated using a private encryption key of the RFID reader 102.
4. The encrypted, digitally signed combined message— $(D+D_{R(E)})+D_{SIG}$—is uploaded to the server 402.
5. The server 402 confirms the digital signature $D_{SIG}$ by using the corresponding public decryption key of the RFID reader 102, which public decryption key has previously been securely uploaded to the public key server 402, as indicated by the dashed arrow 702 in FIG. 7. (In this example the server 402 also acts as a public key server.) This authenticates that the combined message $(D+D_{R(E)})$ was sent by the RFID reader 102 and verifies that it has not been corrupted.
6. The server 402 decrypts the encrypted supplemental information $D_{R(E)}$ using its own corresponding private decryption key, to recover the original supplemental information $D_R$ generated by the RFID reader 102.
7. The server 402 recovers the data D sent by the data processing functional portion 103 and, if appropriate, authenticates and decrypts it, as described herein.

It should be appreciated that to secure and authenticate supplemental information appended to data transferred by an RFID tag 100 to the server 402 requires that (i) each RFID reader 102 stores public keys for the server 402, and (ii) the server 402 stores public keys for all RFID readers 102.

On the other hand, it should be appreciated that using the above method in reverse to secure and authenticate supplemental information appended to data transferred by the server 402 to an RFID tag 100 via an RFID reader 102 requires that (i) each RFID reader 102 stores public keys for all RFID tags 100, and (ii) each RFID tag 100 stores public keys for all RFID readers 102. While possible, this configuration may be challenging, since there may be a large number of RFID tags 100 and/or RFID readers 102, and both RFID tags 100 and RFID readers 102 may have limited data storage capacity.

In those embodiments in which the RFID readers 102 are required to have cryptographic capabilities as described above, key management and key updating methods will preferably be similar to those described herein for the RFID tags 100.

It should be appreciated that if an RFID reader 102 does not add supplemental information to data transferred between the server 402 and RFID tags 100, then there will be no requirement for the RFID reader 102 to incorporate cryptographic capabilities.

Use of a Combination of Asymmetric and Symmetric Cryptographic Techniques

In general a symmetric cryptographic protocol will require fewer operations than an asymmetric cryptographic protocol in order to perform a particular cryptographic function, and will therefore be faster. For this reason it can be advantageous to use symmetric cryptography when carrying out large (computationally intensive) cryptographic operations. On the other hand, asymmetric (i.e. public key) cryptography provides certain benefits—such as the ability to provide source authentication, non-repudiation, and verification of message integrity by means of digital signatures—that are not available through the use of symmetric cryptography. (Non-repudiation is an important benefit in many applications, including for example online commerce. It refers to the fact that a device (sending device) sending information to another device (receiving device) cannot later repudiate, or deny, that it sent the information. Non-repudiation is usually achieved by means of digital signatures. If the sending device generates a digital signature for the information using a private encryption key that is know only to the sending device and sends the digital signature along with the information, then the receiving device, by using the corresponding public decryption key to verify the digital signature, establishes that the information can only have come from the sending device, since the private encryption key used to generate the digital signature is not known to any other device or person.)

In some implementations, therefore, it can be advantageous to employ a mix of symmetric and asymmetric cryptographic techniques to achieve an optimal solution.

Good examples of mixing symmetric and asymmetric cryptographic techniques are technologies known as Transport Layer Security (TLS) and Secure Sockets Layer (or SSL), both of which are used to provide communication security over the internet. In such protocols, a communications session typically begins with a client computer and a server agreeing on the specific cryptographic algorithm and hash function to be used during the session. Normally the server then sends its digital certificate to the client, which may verify the validity of the certificate. Symmetric (private) keys are then generated for use during the ensuing communications session, as follows. Typically the client will generate and encrypt a random number using the server's public key, and send the result to the server. Only the server will be able to decrypt the encrypted random number. From this random number both the client and server generate symmetric keys for encryption and decryption. These symmetric keys are used until the session ends. Clearly a cryptographic methodology such as this could be employed in the current invention by the data processing functional portion 103 and server 402, provided that both the data processing functional portion 103 and server 402 incorporate the required symmetric and asymmetric cryptographic capabilities. An advantage of the above method is that the use of symmetric encryption and decryption is usually much faster than the use of asymmetric encryption and decryption. Disadvantages of the above method include:

it does not provide source authentication or non-repudiation, since both the client and server know the symmetric keys used during a communications session;

it does not provide a means to verify the integrity of the message data (i.e. verification that the message data has not been modified or corrupted).

In the context of the present invention a mix of symmetric and asymmetric cryptographic methods can be employed to overcome the above disadvantages and provide a combination of (i) fast encryption/decryption, (ii) source authentication and non-repudiation, and (iii) verification of data integrity. A preferred process and embodiment is described in the following non-limiting example.

In this non-limiting example the data processing functional portion 103 of an RFID tag 100 and a server 402 need to communicate securely during a communications session. Specifically, in this example the data processing functional portion 103 needs to securely communicate data "D" to the server 402. It is assumed that both the data processing functional portion 103 and server 402 are equipped with asymmetric (public key) cryptographic capabilities (as described herein) and symmetric cryptographic capabilities as required to perform the following functions. A typical sequence of steps may be as described below and illustrated schematically in FIG. 8, for an embodiment in which the server 402 also acts as a public key server. It should be appreciated that there may be embodiments in which the public key server is a separate server on the network 401.

1. The data processing functional portion 103 and server 402 agree on the cryptographic protocols (cipher) and hash function(s) to be used during the session.
2. The server 402 securely sends its public encryption key to the data processing functional portion 103. The data processing functional portion 103 may independently verify the server's public encryption key, by means of separate secure communications with the server 402. Alternatively, the data processing functional portion 103 may securely download the public encryption key for the server 402 from the server 402, or may have previously securely downloaded the public encryption key for the server 402 from the server 402. (It should be appreciated that the server may have more than one public encryption key.)
3. Symmetric (i.e. private) keys are then generated for use by the data processing functional portion 103 and server 402 during the ensuing communications session. In one example the data processing functional portion 103 may generate a random number, encrypt the random number using the server's public encryption key, and securely send the result to the server 402. Only the server 402 will be able to decrypt the encrypted random number by using its corresponding private decryption key. From this random number both the data processing functional portion 103 and server 402 generate symmetric keys $K_S$ for encryption and decryption during the ensuing session.
4. The data processing functional portion 103 encrypts the data D using a symmetric key $K_S$.
5. The data processing functional portion 103 then uses one of its private (asymmetric) encryption keys to generate a digital signature for the encrypted data.
6. The encrypted data and digital signature are sent to the server.
7. The server 402 validates the digital signature by using the public decryption key for the data processing functional portion 103—i.e. the public key previously securely uploaded to the server 402 corresponding to the private key used to generate the digital signature. This enables the server 402 to verify that the encrypted data came from the data processing functional portion 103 and has not been modified or corrupted.
8. The server 402 uses the symmetric key $K_S$ to decrypt the encrypted data, thereby recovering the data D.

It can be appreciated that the above described preferred process provides fast encryption and decryption of the data D since the encryption and decryption are carried out using symmetric cryptography. This speed benefit becomes more pronounced (relative to the use of asymmetric cryptography) as the volume of data D increases. It can also be appreciated that source authentication, non-repudiation and verification of data integrity are provided through the generation and verification of a digital signature. While the digital signature is generated using asymmetric (public key) cryptography, this does not slow the overall process significantly, since only a small amount of data needs to be encrypted and decrypted in the digital signature generation and verification processes.

The same method, and the same symmetric keys, can be used during the communications session to undertake further secure data exchanges between the data processing functional portion 103 and server 402. It should be appreciated that the method can be used in reverse to securely transfer data from the server 402 to the data processing functional portion 103, again preserving the combination of (i) fast encryption/decryption, (ii) source authentication and non-repudiation, and (iii) verification of data integrity.

It should also be appreciated that there are variations on the above described process that will maintain the combination of fast encryption/decryption, (ii) source authentication and non-repudiation, and (iii) verification of data integrity. For example, in one such variation a digital signature for the data D is generated prior to encryption of the data D. In another variation a digital signature for the data D is generated and the data D plus digital signature then encrypted.

More generally, it should be appreciated that the data processing functional portion 103 and server 402 can be equipped with both symmetric and asymmetric cryptographic capabilities, and that the symmetric and asymmetric cryptographic capabilities can be configured and operated so as to provide a combination of:

fast encryption/decryption through the use of symmetric cryptography;

source authentication, non-repudiation and verification of data integrity through the use of asymmetric (public key) cryptography to generate and verify digital signatures.

Example Use Cases

The network configuration described herein allows users on the network 401 to access the server 402 and interact with RFID tags 100 on the network 401.

FIG. 4 shows a device 403 on the network 401.

The device 403 may be automated or manually operated. In one embodiment the device 403 may be a computer terminal operated by a person.

Preferably the device 403 is able to log on to the server 402 via the network 401 and perform any of a number of functions in relation to the RFID tags 100. Said functions may include, without limitation, the following:

obtaining current information in real time from a specified range of RFID tags 100 that are connected to the server 402—to do this the server 402 will query the specified RFID tags 100 (via RFID readers 102) and obtain the requested information from the data processing functional portion 103 of each of the specified RFID tags 100;

obtaining historical information regarding a specified range of RFID tags 100 that are part of the network 401 but that may or may not be connected to the server 402 at the time of the request—said historical information will preferably be gathered by and retained on the server 402;

requesting next-available information from specified RFID tags 100 that are part of the network 401 but that are not connected to the server 402 at the time of the request—said information will be obtained by the server 402 from the specified RFID tags 100 when said specified RFID tags 100 are next connected to the server 402, which may be at different times for different of said specified RFID tags 100;

sending data to the server 402 for transfer to specified RFID tags 100 either at that time or when each of said specified RFID tags 100 is next connected to the server 402. Said data may be stored on the RFID tags 100 or may be used to reprogram or reconfigure said RFID tags 100 or may be used by said RFID tags 100 to control or modify a device or process to which said RFID tags are connected.

In one embodiment the server 402 may be configured to automatically gather data from each of a specified range of RFID tags 100 when said RFID tags 100 first connect to the server 402 and at specified time intervals while said RFID tags 100 remain connected to the server 402.

As noted herein, some of said RFID tags 100 may interface to an apparatus or process in order to be able to transfer information to said apparatus or process to influence or control said apparatus or process. A user on the network 401 may be able to connect to the server 402—for example, by means of the device 403—and transfer to said server 402 instructions that the server 402 transfers (by means of RFID readers 102) to specified RFID tags 100 in order to influence or control said apparatus or process according to said instructions.

Connection between the device 403 and server 402 may be secured and authenticated using public/private key cryptographic technology, as described herein. In one preferred embodiment, connection between the device 403 and server 402 may be secured and authenticated using conventional public key infrastructure methodology.

It should be appreciated that there are numerous possible ways for a user to interact with the server 402 so as to obtain information from or send information to RFID tags 100 on the network 401.

RFID Tag Data Used to Control Other Apparatus or Processes

In an embodiment of the present invention data transferred from one or more RFID tags 100 (the input RFID tags 100) to the server 402 may include input data pertaining to an apparatus or process. For example, said input data may represent environmental conditions in the vicinity of said apparatus or process. In one preferred embodiment this input data may be obtained by means of one or more sensors connected to each of said input RFID tags 100, with data from each of said sensors being transferred to the data processing functional portion 103 of an input RFID tag 100.

The server 402 may process said input data and thereby generate control data that is then used to modify said apparatus or process in response to said input data.

In one embodiment said control data may be transferred from the server 402 to the data processing functional portion 103 of one or more specified RFID tags 100, which specified RFID tags 100 are connected to or in communication with said apparatus or process. Said specified RFID tags 100 are able to accept said control data and transfer it from the data processing functional portions 103 of said RFID tags 100 to said apparatus or process so as to achieve the intended modification of said apparatus or process.

In a simple example, a temperature sensing RFID tag 100 may send temperature information to the server 402, as a result of which the server 402 may send control data to a second RFID tag 100 that is connected to a heating or cooling process. The control data is transferred from the second RFID tag 100 to said heating or cooling process, which is thereby modified, resulting in the intended change in the temperature sensed by the temperature sensing RFID tag 100.

RFID Tag Data Used to Modify Other RFID Tags

In another embodiment said control data may be transferred from the server 402 to the data processing functional portion 103 of one or more specified RFID tags 100 and used to modify the programming or configuration of the data processing functional portion 103 of said specified RFID tags 100.

Use of Biometrics to Control RFID Tags 100

In some preferred embodiments of the present invention the RFID tag 100 may be configured to include a biometric identification capability that is linked to the cryptographic operation of the data processing functional portion 103.

Said biometric identification capability will preferably include the ability to store biometric template data, the ability to accept live biometric input data (e.g. fingerprint data, voice data, facial image data, retinal scan data, etc.), and the ability to compare live and template biometric data and generate a signal indicative of the result of said comparison.

In one preferred embodiment the data processing functional portion 103 will generate and retain biometrically associated public/private cryptographic key pairs corresponding to each authorized user of the RFID tag 100. The generation of said biometrically associated key pairs will preferably not be dependent on any biometric data. All biometrically associated private keys will preferably be retained secretly within the data processing functional portion 103 and be disabled by default—said biometrically associated private keys will be enabled only to undertake specific biometrically authorized cryptographic operations, as described below. The biometrically associated public keys generated by the data processing functional portion 103 will preferably be released publicly for use by other devices, such as other similar RFID tags 100 or the server 402. In particular, the biometrically associated public keys generated by the data processing functional portion 103 will preferably be securely uploaded to the public key repository 402, as described herein.

Preferably the RFID tag 100 will include the capability to read live biometric data from a user of the RFID tag 100 and to transfer said live biometric data to the data processing functional portion 103.

Preferably the data processing functional portion 103 will include the capability to generate template biometric data (derived from live biometric data) for an authorized user of the RFID tag 100 and to securely store said template biometric data in association with a public/private cryptographic key pair corresponding to the authorized user of the RFID tag 100 in the data processing functional portion 103.

Figure 9:
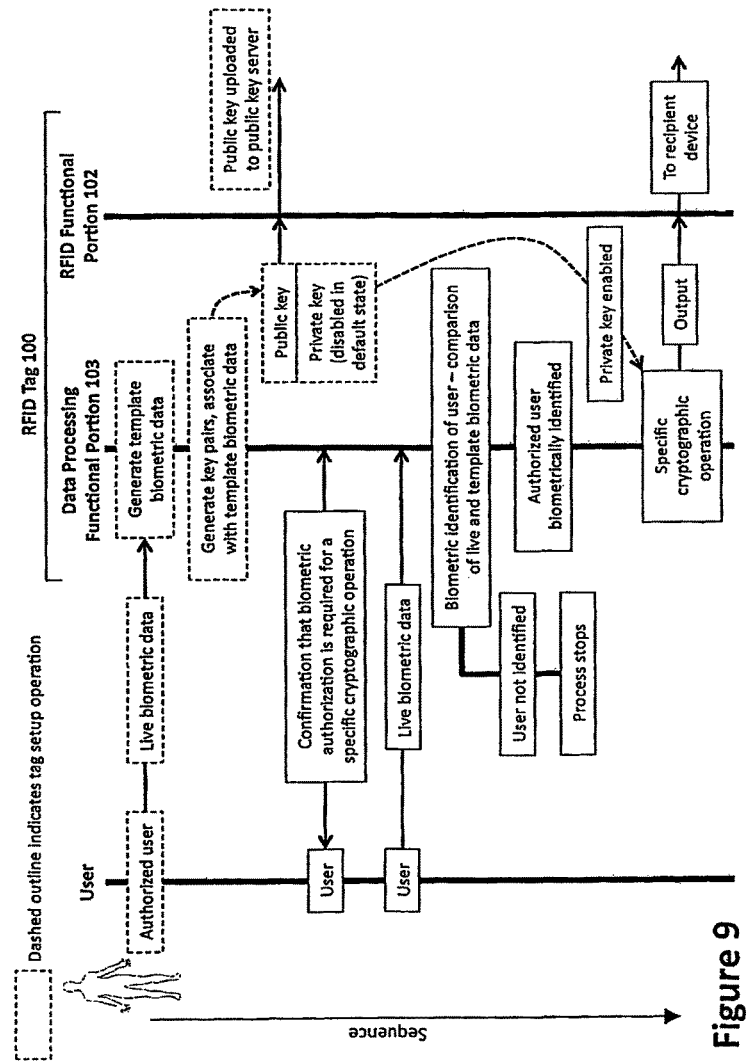
FIG. 9 is a schematic representation of a process for carrying out a biometrically authorized cryptographic operation in the network of FIG. 4.

In a preferred embodiment the data processing functional portion 103 of an RFID tag 100 may be configured to function as described below and illustrated in FIG. 9 when the RFID tag 100 undertakes a specific biometrically authorized cryptographic operation:

- the data processing functional portion 103 indicates to a user of the RFID tag 100 (for example, by means of a display, or a light, or an audio signal, etc.) that biometric authorization is required in order to undertake a specific cryptographic operation, or alternatively a user of the RFID tag 100 indicates to the data processing functional portion 103 that a specific cryptographic operation is to be undertaken and must be biometrically authorized;
- the user of the RFID tag 100 then inputs live biometric data of the appropriate type (e.g. fingerprint, voice, iris, face, etc.);
- the data processing functional portion 103 compares the live biometric data to the stored template biometric data in order to determine biometrically whether said user is an authorized user of the RFID tag 100, and hence whether said user is authorized to carry out said specific cryptographic operation—if the user is biometrically identified as an authorized user of the RFID tag 100 then the process continues as described below, while on the other hand if the user is not identified the process is stopped;
- if said user is determined to be an authorized user, said data processing functional portion 103 enables one or more biometrically associated private cryptographic keys corresponding to said authorized user in order to undertake said specific cryptographic operation (now a biometrically authorized specific cryptographic operation)—said private cryptographic keys are not enabled for any other purpose and otherwise remain disabled;
- said biometrically authorized cryptographic operation is carried out by the data processing functional portion 103 using said biometrically associated private cryptographic key(s);
- the results of said biometrically authorized cryptographic operation are output from the data processing functional portion 103 and made available for transfer to the intended recipient device (for example, to the server 402) by RFID means, as described herein.

By using the public key corresponding to said biometrically associated private key, which public key has been previously securely uploaded to the public key server to allow verification by any device on the network 401, the recipient device can confirm that said biometrically authorized cryptographic operation was carried out using said biometrically associated private key, and thereby in effect biometrically identify said authorized user as the originator of said specific cryptographic operation. The public key corresponding to said biometrically associated private key can be verified by reference to the public key server—in this embodiment the server 402—as described herein.

The above procedure enables the biometric identification of an authorized user of the RFID tag 100, and the biometric association of said authorized user with a specific data transfer operation from said RFID tag 100 to a recipient device, without the biometric template data or live biometric data for said authorized user having to be released from the data processing functional portion 103 of the RFID tag 100 into the network 401. The procedure thereby ensures the security and privacy of said authorized user's biometric information.

The invention claimed is:

1. A radio frequency identification (RFID) tag comprising:
    an RFID functional portion configured to enable wireless communication between the RFID tag and an RFID reader;
    a data processing functional portion with asymmetric cryptographic capability and symmetric cryptographic capability; and
    a power source configured to power the data processing functional portion,
    wherein the data processing functional portion comprises:
        means to generate public-private cryptographic key pairs, each public-private cryptographic key pair comprising a public key and a private key for use in asymmetric cryptographic operations;
        means to securely and secretly retain said private keys; and
        means to release said public keys for use by other devices,
    wherein communication between the RFID tag and the RFID reader is based on both the symmetric and asymmetric cryptographic capabilities of the data processing functional portion.

2. A tag according to claim 1, wherein said power source is configured to power the RFID functional portion.

3. A tag according to claim 2, wherein said power source is not configured to generate or boost radio frequency transmission from the RFID functional portion.

4. A tag according to claim 1, wherein the data processing functional portion is further configured to store a unique unalterable identification code.

5. A tag according to claim 1, wherein the data processing functional portion further comprises:
    means to associate one or more private cryptographic keys with an authorized user of the RFID tag;
    means to store said associated private keys in a default disabled state such that in the disabled state said private keys cannot be used;
    means to securely store template biometric data for said authorized user in association with said private keys;
    means to accept live biometric data from a user of the RFID tag;
    means to compare said live biometric data with said template biometric data and thereby determine whether said live biometric data corresponds to said authorized user of the RFID tag;
    means to select and enable for a specified cryptographic operation a biometrically associated private cryptographic key depending on the result of said comparison of live and template biometric data, said biometrically associated private cryptographic key otherwise remaining disabled, and wherein the live biometric data comprises one or more of the group consisting of fingerprint data, voice data, facial image data, and retinal scan data.

6. A network comprising:
    a server with asymmetric cryptographic capability;
    a plurality of radio frequency identification (RFID) tags;
    one or more RFID readers, each RFID reader being configured to relay data between the server and one or more RFID tags, thereby enabling secure and authenticable communication between the one or more RFID tags and the server; and
    a public key server configured to securely store public keys from public-private cryptographic key pairs for retrieval by any of the server, the RFID readers, and the RFID tags,
    wherein each of the server and the RFID tags is configured to upload at least one public key generated thereby to the public key server.

7. A network according to claim 6, wherein the server comprises:
    means to generate public-private cryptographic key pairs, each public-private cryptographic key pair comprising a public key and a private key for use in asymmetric cryptographic operations;
    means to securely and secretly retain said private keys; and
    means to release said public keys for use by other devices.

8. A network according to claim 6, wherein each RFID functional portion is configured to enable wireless communication between the corresponding RFID tag and any of the RFID readers.

9. A network according to claim 6, wherein the server and each RFID tag are further configured with symmetric cryptographic capability, and wherein the secure and authenticable communication between the one or more RFID tags and the server uses both the symmetric and asymmetric cryptographic capabilities thereof.

10. A network according to claim 6, wherein at least one RFID reader is further configured to add supplemental information to the data being relayed between the server and the one or more RFID tags, and wherein the at least one RFID reader has asymmetric cryptographic capability such that said supplemental information is added securely and authenticably to the data being relayed between the server and the one or more RFID tags.

11. A network according to claim 10, wherein the at least one RFID reader has symmetric cryptographic capability such that said supplemental information is added securely to the data being relayed between the server and the one or more RFID tags, and at least one RFID tag is configured to interface to an apparatus or process in order to:
    receive data from said apparatus or process, or
    transfer information to said apparatus or process to influence or control said apparatus or process.

12. A network according to claim 6, further comprising a device connected to the server, the device being configured to perform one or more of:
    obtain information from the server, the information relating to one or more of the RFID tags; and
    send data to the server, the server being configured to transfer the data to one or more of the RFID tags via the RFID readers, and wherein at least one RFID reader is configured to relay data between the server and the one or more RFID tags in a manner dependent on the type of the one or more RFID tags.

13. A network according to claim 6, further comprising one or more passive RFID tags, wherein each passive RFID tag comprises an RFID functional portion configured to enable wireless communication between the passive RFID tag and an RFID reader, and wherein at least one RFID reader is configured to relay data between the server and the one or more RFID tags in a manner dependent on whether the one or more RFID tags are passive RFID tags.

14. A method of securely communicating data between a radio frequency identification (RFID) tag and a server, the method comprising:
    generating, by the RFID tag and the server, a symmetric encryption/decryption key;
    encrypting, by one of the RFID tag and the server, the data using the symmetric encryption/decryption key;
    generating, by the one of the RFID tag and the server, a digital signature for the data using an asymmetric private key;
    wirelessly transmitting, by the one of the RFID tag and the server, the encrypted data and the digital signature to the other of the RFID tag and the server;
    validating, by the other of the RFID tag and the server, the digital signature using an asymmetric public key corresponding to the asymmetric private key, said asymmetric public key being authenticated by reference to a public key server;
    decrypting, by the other of the RFID tag and the server, the encrypted data using the symmetric encryption/decryption key.

15. A method according to claim 14, wherein the generating of the symmetric encryption/decryption key comprises:
    generating, by one of the RFID tag and the server, a random number;
    encrypting, by the one of the RFID tag and the server, the random number using a public cryptographic encryption key of the other of the RFID tag and the server;
    transmitting, by the one of the RFID tag and the server, the encrypted number to the other of the RFID tag and the server;
    decrypting, by the other of the RFID tag and the server, the encrypted random number using a private decryption key of the other of the RFID tag and the server corresponding to the public cryptographic encryption key; and generating, by the RFID tag and the server, the symmetric encryption/decryption key using the random number.

16. A method according to claim 14, wherein the digital signature is generated for the encrypted data, and the method further comprises, prior to wirelessly transmitting the encrypted data and the digital signature, encrypting the digital signature using the symmetric encryption/decryption key.

17. A method according to claim 14, wherein the wireless transmitting comprises:
   transmitting, by the one of the RFID tag and the server, the encrypted data and the digital signature to an RFID reader;
   encrypting, by the RFID reader, supplemental information using a public cryptographic encryption key of the other of the RFID tag and the server;
   generating, by the RFID reader, a second digital signature for the encrypted supplemental information and the encrypted data and the digital signature using an asymmetric private key associated with the RFID reader;
   transmitting, by the RFID reader, the encrypted supplemental information, the encrypted data and the digital signature, and the second digital signature to the other of the RFID tag and the server;
   validating, by the other of the RFID tag and the server, the second digital signature using a second asymmetric public key corresponding to the asymmetric private key associated with the RFID reader, said second asymmetric public key being authenticated by reference to a public key server; and
   decrypting, by the other of the RFID tag and the server, the encrypted supplemental information using a private decryption key of the other of the RFID tag and the server corresponding to the public cryptographic encryption key.

18. A method of updating a public cryptographic decryption key stored at one of an RFID tag and a server, said public cryptographic decryption key originating from the other of the RFID tag and the server, the method comprising:
   combining, by the other of the RFID tag and the server, a new public cryptographic decryption key with a current public cryptographic decryption key corresponding to the public cryptographic decryption key stored at the one of the RFID tag and the server;
   generating, by the other of the RFID tag and the server, a digital signature for the combined new public cryptographic decryption key and current public cryptographic decryption key using a private cryptographic encryption key corresponding to the current public cryptographic decryption key;
   transmitting, by the other of the RFID tag and the server, the combined new public cryptographic decryption key and current public cryptographic decryption key and the digital signature to the one of the RFID tag and the server,
   validating, by the one of the RFID tag and the server, the digital signature using the public cryptographic decryption key stored at the one of the RFID tag and the server, where the public cryptographic decryption key has previously been securely transferred to the one of the RFID tag and the server; and
   replacing the public cryptographic decryption key stored at the one of the RFID tag and the server with the new public cryptographic decryption key.

19. A method according to claim 18, further comprising, before the combining, determining, by the other of the RFID tag and the server, whether the public cryptographic decryption key stored at the one of the RFID tag and the server is the same as the new public cryptographic decryption key, and proceeding with the combining based on the determination, and wherein before the combining, transferring, by the other of the RFID tag and the server, via an authenticated communications link, the current public cryptographic decryption key for storage at the one of the RFID tag and the server.

* * * * *